United States Patent [19]

Poretti

[11] 3,749,842

[45] July 31, 1973

[54] TIME-SLOT-ALLOCATION NETWORK FOR MULTIPLEX TELECOMMUNICATION SYSTEM

[75] Inventor: Isidoro Poretti, Castiglione Olona (Varese), Italy

[73] Assignee: Societe Italiana Telecommunicazioni Siemens S.p.A., Milan, Italy

[22] Filed: Jan. 11, 1972

[21] Appl. No.: 216,979

[30] Foreign Application Priority Data

Jan. 11, 1971 Italy .............................. 19208 A/71

[52] U.S. Cl. .......................... 179/15 BY, 179/15 BA

[51] Int. Cl. .................................................. H04j 3/04

[58] Field of Search ..................... 179/15 BA, 15 BY

[56] References Cited

UNITED STATES PATENTS

| | | | |
|---|---|---|---|
| 3,591,722 | 7/1971 | Palsa | 179/15 BY |
| 3,641,273 | 2/1972 | Wolf | 179/15 BA |

*Primary Examiner*—Ralph O. Blakeslee
*Attorney*—Karl F. Ross

[57] ABSTRACT

A transmitting station having access to a telecommunication channel shared by *m* such stations synthesizes a composite word from interleaved groups of bits supplied by *n* associated feeder lines, each group of bits consisting of up to three subgroups from a corresponding number of sources of data or telegraphic messages connected to the respective line. The composite word, along with a bit of a code word forming part of an assignment message indicating the number of bits assigned to each source of any active line, is transmitted over the common channel as one of *m* subframes respectively allocated to these stations in a recurrent frame. The current time-slot allotments of all active feeder lines, determined by respective manual selectors at the associated transmitting station, are consecutively communicated during each subframe by a scanner to a signal generator for causing the emission of up to three gating pulses of variable duration which span one or more clock cycles according to the number of bits assigned to the several sources; emission of the assignment bit occurs at the end of the subframe. At a correlated receving station connected across the same channel, the assignment of time slots within the subframe to the several sources represented by incoming data bits is ascertained by an analogous scanner co-operating with a similar generator whose gating pulses are controlled by an extraction circuit decoding corresponding code words of the accompanying assignment message.

10 Claims, 11 Drawing Figures

PATENTED JUL 31 1973

3,749,842

SHEET 5 OF 8

PATENTED JUL 31 1973

3,749,842

SHEET 6 OF 8

TIME-SLOT-ALLOCATION NETWORK FOR MULTIPLEX TELECOMMUNICATION SYSTEM

My present invention relates to a time-division-multiplex (TDM) telecommunication system serving for the transmission of pulse-code-modulation messages, such as telegraphic signals or data, that do not require the maintenance or precise synchronism for intelligibility.

In commonly owned application Ser. No. 212,514, filed 27 Dec. 1971 by Paolo Fornasiero and Sergio Tomasi, there has been disclosed a system of this type wherein a plurality of access units or transmitting stations communicate with a like number of distributing units or recieving stations by way of a common channel (such as a wire line or a radio link), these access and distributing units being periodically scanned by two synchronized switching circuits at an input terminal and an output terminal of that channel, respectively. Each of the several access units serves an associated group of feeder channels or lines supplying binary messages which are sampled at a rate or cadence that may be different for the several groups. These incoming messages are interleaved at the associated access unit, bit by bit or character by character, for transmission over the common channel in the course of a subdivision (hereinafter referred to as a subframe) of a recurrent binary frame, each access unit having allocated to it a particular subframe within that frame. At the receiving end, the corresponding distributing units rearrange the interleaved message bits or characters in order to route them to their respective destinations.

In such a system the several subframes may vary in length as measured in terms of number of clock cycles established by an emitter of clock pulses at the input terminal and a similar emitter in step therewith at the output terminal. Thus, a transmitting station fed by message sources which are smaller in number, less frequently active or operating at a lower rate than those of another such station evidently requires a lesser number of bits to handle its traffic. On the other hand, it is desirable that each transmitting station be allowed to assign time slots of different durations, or even none at all, to some of its feeder lines within the limits of its allocation, in order to accommodate varying traffic conditions.

Thus, the principal object of my present invention is to provide, in a telecommunication system of the general character set forth, means for permitting such flexibility in the assignment of time slots and for promptly informing the correlated receiving station of any change in the number of bits per subframe assigned to any source.

A more specific object is to provide means in such a system for maximizing the number of assignable bits per subframe by letting the time slots of all active sources follow one another as closely as possible.

These objects are realized, in accordance with my present invention, by supplementing the message portion of each subframe allocated to a given transmitting station with digital information indicating the state of activity of respective message sources associated with that station and the length of any time slot assigned thereto, i.e. the number of consecutive bits made available to each active source. This digital information, spread over a number of consecutive frames, is extracted at a correlated receiving station which thereby determines the origin of the message bits of an incoming subframe to be distributed to the several destinations served by the latter station.

This technique can be used in a point-to-point communication system, in which each source transmits to a specific destination, as well as in time-division systems of the multiple-access type (TDMA) wherein messages arriving over the common channel may be picked up by any of several receiving stations.

Advantageously, for the purpose of minimizing the length of the subframe portion utilized for the transmission of the assignment information, only one bit of an assignment word is transmitted in any frame, preferably at the end thereof. The several bits needed to convey the information that a given source is active, and that its assigned time slot has one of several possible durations, thus requires a multi-bit code word spread over a corresponding number of frames; if there are $n$ sources in the associated group, there will be $n$ times as many frames required to transmit the entire assignment message. Furthermore, the bit position normally reserved for the assignment information may be used intermittently, advantageously after every transmission of a complete assignment message, for the conveyance of a synchronizing code designed to insure proper correlation between the several assignment codes received by the destination station and the distributing logic at that station which routes the arriving bits or bit combinations to their destinations.

Although each assignment code may relate just to a single source, it is frequently advantageous to divide the sources of a particular group into several subgroups of two or more sources each which, by the nature of their operation, can have their bit allotments jointly controlled by a single selector stage. In that instance the several possible settings of such a selector stage may be communicated by a single code word of two or more bits. Each selector stage may comprise a plurality of manual switches (or an equivalent multiposition switch) although automatic operation — e.g. in response to deactivation of a feeder line — is not excluded.

The assignment of a time slot to any source by a corresponding selector or switching stage gives rise to an activity signal indicating to a timing circuit that this particular source is engaged in message transmission. This timing circuit may comprise a signal generator in the form of a clock-pulse counter having certain outputs connected to a logic matrix which is successively connected, by an electronic scanner, to different switching stages of the selector circuit for producing a sequence of gating pulses whose duration depends on the setting of the respective switching stage.

The scanner, according to a further feature of my invention, is also divided into several stages each associated with a respective switching stage which, by the emission of its activity signal, conditions a bistable circuit or flip-flop of the scanning stage for setting by a switching pulse at the beginning of a subframe and which is resettable by any one of a train of restoring pulses that are generated in the rhythm of the clock pulses as delayed replicas thereof; the resetting of a flip-flop, however, depends on the absence of a gating pulse from the logic matrix of the common signal generator so that a switchover to another stage takes place only upon the termination of a previously generated gating pulse. Upon such switchover, which can take place only between scanning stages associated with active sources, the clock-pulse counter restarts immediately (within the same clock cycle) so that only a minor hiatus develops between the gating pulses generated in different scanning phases. The several flip-flops are interconnected in a lockout chain so as to be consecutively enabled, upon setting, to connect their respective switching stages to the logic matrix of the signal generator.

At the correlated receiving station, equipment analogous to that of the transmitting station reconstitutes the activity signals on the basis of the assignment information retrieved by the extractor under the control of the local programmer. The necessary synchronization between the two stations may be carried out on a frame-by-frame or a subframe-by-subframe basis, e.g. with the aid of a recurrent reference code which is detected by an address decoder at the receiving terminal to identify the several subframes. The decoder may include an integrating circuit designed to ascertain the recurrence of the same reference code, at predetermined intervals corresponding to the length of one or more frames, for a sufficient number of times to exclude fortuitous groupings of bits duplicating the reference code. Such an arrangement has also been described, for a frame-by-frame synchronization, in the commonly owned application referred to above.

The above and other features of my invention will now be described in detail with reference to the accompanying drawing in which.

Figure 1:
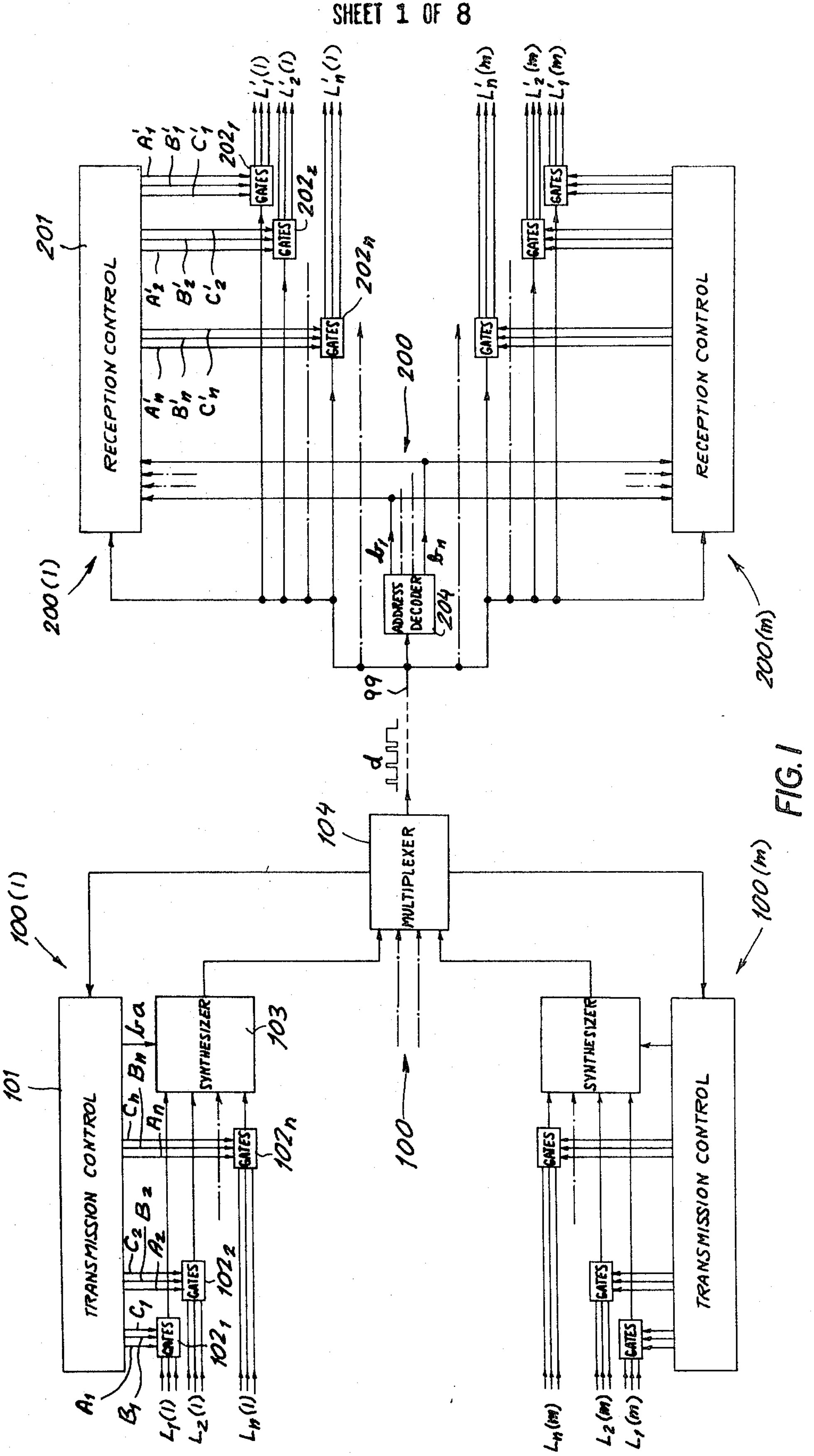
FIG. 1 is a block diagram schematically illustrating a telecommunication system embodying my invention.

In FIG. 1 I have illustrated a telegraphic or data-transmitting system in which a communication path 99 inter-connects two terminals 100 and 200. Terminal 100, at the input end of transmission path 99, includes several transmitting stations 100(1)...**100(*m*) each serving a group of feeder lines designated $L_1$(1), $L_2$(1),...$L_n$(1) in the case of the first and $L_1$(m), $L_2$m.,,,$L_n$(m) in the case of the last of these stations. Similarly, terminal 200 includes several receiving stations 200(1) – 200(*m*) serving respective groups of outgoing lines which have been designated $L'_1$(1), $L'_2$(1).,,,$L'_n$(1)** in the case of the former and $L'_1$(m), $L'_2$(m),...$L'_n$(m) in the case of the latter. Each of these lines is shown to consist of a plurality of parallel wires, specifically three, extending to or from respective message sources or destinations.

With all transmitting stations and all receiving stations assumed to be mutually identical (except that the number *n* of associated lines may vary among them), only stations 100(1) and 200(1) will be described in detail hereinafter. Transmitting station 100(1) includes a transmission-control circuit 101, more fully described hereinafter with reference to FIG. 2A, which times the opening and closing of respective gating circuits $\mathbf{102_1}$, $\mathbf{102_2}$,...$\mathbf{102_n}$ inserted between lines $L_1$(1), $L_2$(1),...$L_n$(1) and a synthesizer 103 through which these lines are given access to the input end of channel 99 by way of a multiplexer 104 interleaving, e.g. on a bit-by-bit basis, the several composite words simultaneously arriving from the respective synthesizers of the various transmitting stations. Each gating circuit $\mathbf{102_1}$, $\mathbf{102_2}$,...$\mathbf{102_n}$ comprises three gates, one for each line wire, respectively controlled by leads $A_1$, $B_1$, $C_1$; $A_2$, $B_2$, $C_2$;...$A_n$, $B_n$, $C_n$ originating at the control circuit 101.

In an analogous manner, gating circuits $\mathbf{202_1}$, $\mathbf{202_2}$,...$\mathbf{202_n}$ are inserted at the receiving end between channel 99 and the respective outgoing lines $L'_1$(1), $L'_2$(1),...$L'_n$(1); the triple gates in the latter circuits are linked with a reception-control circuit 201 by way of respective leads $A'_1$,$B'_1$, $C'_1$; $A'_2$, $B'_2$, $C'_2$;...$A'_n$, $B'_n$, $C'_n$. Output terminal 200 also includes an address decoder 204 serving to synchronize the control circuits of the several receiving stations with those of the transmitting stations at terminal 100. Details of reception-control circuit 201 will be described in detail hereinafter with reference to FIG. 2B. With the exception of control circuits 101 and 201, all the components of the system shown in FIG. 1 are well known per se.

Figure 2A:
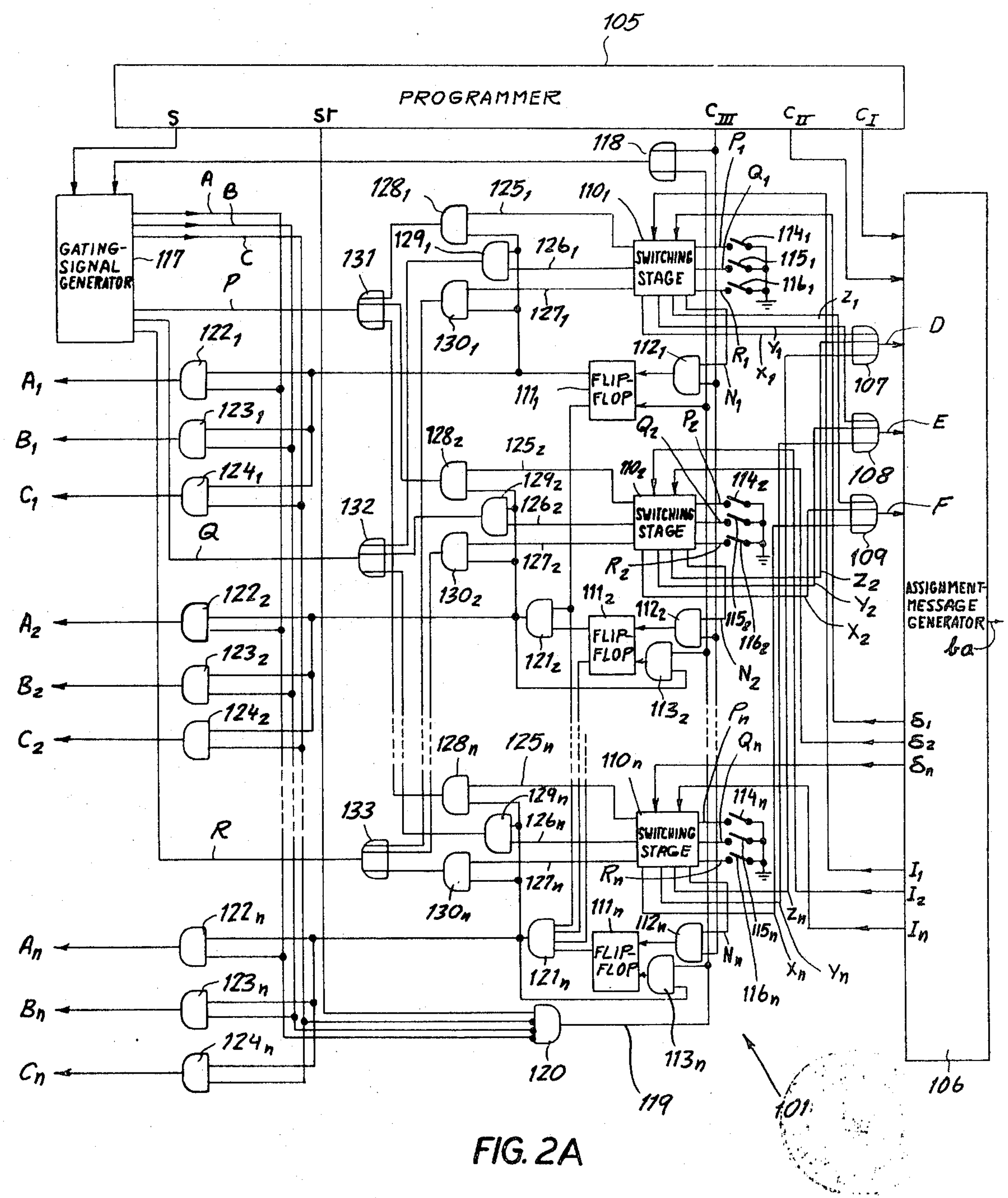
FIGS. 2A and 2B are more detailed circuit diagrams of respective components of a transmitting station and a receiving station shown in FIG. 1.
Figure 3A:
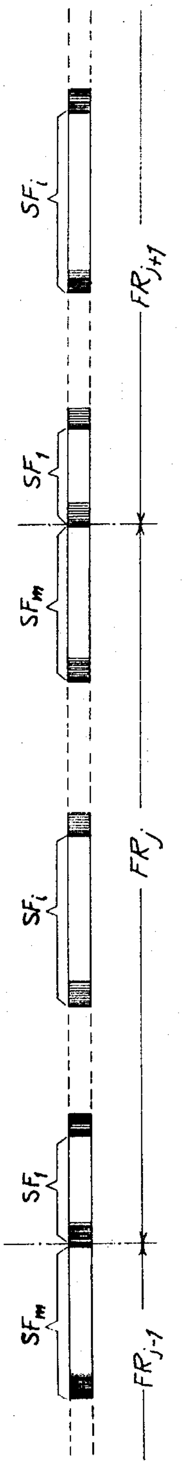
FIGS. 3A, 3B and 3C are time diagrams relating to the operation of the system of FIG. 1.

As shown in FIG. 2A, circuit 101 comprises a programmer 105 which may be controlled by a central timer in unit 104 (FIG. 1) to emit two interleaved trains of clock pulses, i.e. stepping pulses *s* and restoring pulses *sr*, as well as three types of periodically recurring switching pulses $c_I$, $c_{II}$, $c_{III}$. Programmer 105 may contain a counter stepped by the clock pulses *s* to measure a predetermined number of clock cycles constituting a subframe, such as the one designated $SF_i$ in FIGS. 3A and 3C, which is specifically allocated to the transmitting station here considered and occupies a predetermined time position in a recurrent frame such as the one generically designated $FR_j$. Switching pulses $c_I$ and $c_{II}$ occur, one clock cycle apart, at the end of a subframe and bracket a bit *ba* forming part of an assignment message. This bit is followed, at the beginning of the next subframe, by a combination of bits with a synchronizing function referred to hereinafter as an address code and designated $ad_i$ in the case of subframe $SF_i$. Pulse $c_{III}$ appears in the wake of this address code.

An assignment-message generator 106 delivers the bits *ba* to synchronizer 103 in response to pulses $c_I$. This message generator also receives the switching pulses $c_{II}$ as well as activity signals D, E and F originating at respective OR gates 107, 108, 109. OR gate 107 has *n* inputs connected to respective leads $x_1$, $x_2$,...$x_n$ originating at respective selector stages $\mathbf{110_1}$, $\mathbf{110_2}$,...$\mathbf{110_n}$ more fully described below with reference to FIG. 4 (for the sake of simplicity, the various leads and the signals appearing thereon will be designated by the same reference characters). Similarly, OR gates 108 and 109 have respective inputs connected to sets of leads $y_1$, $y_2$,...$y_n$ and $z_1$, $z_2$,...$z_n$.

Selector stages $\mathbf{110_1}$, $\mathbf{110_2}$,...$\mathbf{110_n}$ are individually associated with respective scanning stages including flip-flops $\mathbf{111_1}$, $\mathbf{111_2}$,...$\mathbf{111_n}$ which are settable by the outputs of respective AND gates $\mathbf{112_1}$, $\mathbf{112_2}$,...$\mathbf{112_n}$ and, except for the first flip-flop $\mathbf{111_1}$, are resettable via AND gates $113_2 - 113_n$. AND gates $112_1, 112_2, \ldots 112_n$ have one input connected to lead $c_{II}$ and another input connected to respective leads $N_1, N_2, \ldots N_n$ extending from the associated selector stages. These latter stages, in turn, are settable in various positions by individual manual switches $114_1, 114_2, \ldots 114_n$; $115_1, 115_2, \ldots 115_n$; $116_1, 116_2, \ldots 116_n$ operable to ground respective input leads $P_1, P_2, \ldots P_n$; $Q_1, Q_2, \ldots Q_n$; $R_1, R_2, \ldots R_n$.

A gating-signal generator 117 receives the stepping pulses $s$ from programmer 105 along with switching pulses $c_{III}$, the latter passing through an OR gate 118 also having an input lead 119 which originates at an AND gate 120 and is connected directly to the resetting input of flip-flop $111_1$ and to an input of AND gates $113_2 - 113_n$ in the corresponding inputs of the remaining flip-flops; the other inputs of these latter AND gates are connected in a feedback path to the outputs of respective AND gates $121_2 - 121_n$ whose inputs are tied on the one hand to the set outputs of the associated flip-flops $111_2 - 111_n$ and on the other hand to the reset outputs of all the lower-order flip-flops in a circuit which will be recognized as a lockout chain. AND gate 120 has a noninverting input connected to lead $sr$ and three inverting inputs connected to respective output leads A, B and C of generator 117 which also terminate at the inputs of respective AND gates $122_1, 122_2, \ldots 122_n$; $123_1, 123_2, \ldots 123_n$; $124_1, 124_2, \ldots 124_n$ delivering the gating signals $A_1$, $B_1$, $C_1$, etc. discussed in conjunction with FIG. 1. Flip-flop $111_1$, when set, opens the AND gates $122_1$, $123_1$ and $124_1$ for the passage of pulses A, B and C, respectively; flip-flops $111_2 - 111_n$ have the same function with reference to gates $122_2, 123_2, 124_2 - 122_n, 123_n, 124_n$. Selector or switching stages $110_1, 110_2, \ldots 110_n$ also respond to trigger pulses $\delta_1, \delta_2, \ldots \delta_n$ and $I_1, I_2, \ldots I_n$ emitted by message generator 106.

The condition of switching stages $110_1$ etc., representative of the state of activity of the respective feeder lines, is communicated to signal generator 117 by way of output leads $125_1, 125_2, \ldots 125_n$; $126_1, 126_2, \ldots 126_n$; $127_1, 127_2, \ldots 127_n$ working into respective AND gates $128_1, 128_2, \ldots 128_n$; $129_1, 129_2, \ldots 129_n$; $130_1, 130_2, \ldots 130_n$. Each of these gates also has an input connected to the set output of the respective flip-flop. Corresponding gates $128_1 - 128_n$, $129_1 - 129_n$ and $130_1 - 130_n$ work through respective OR gates 131, 132, 133 into respective leads P, Q and R terminating at generator 117.

Figure 2B:
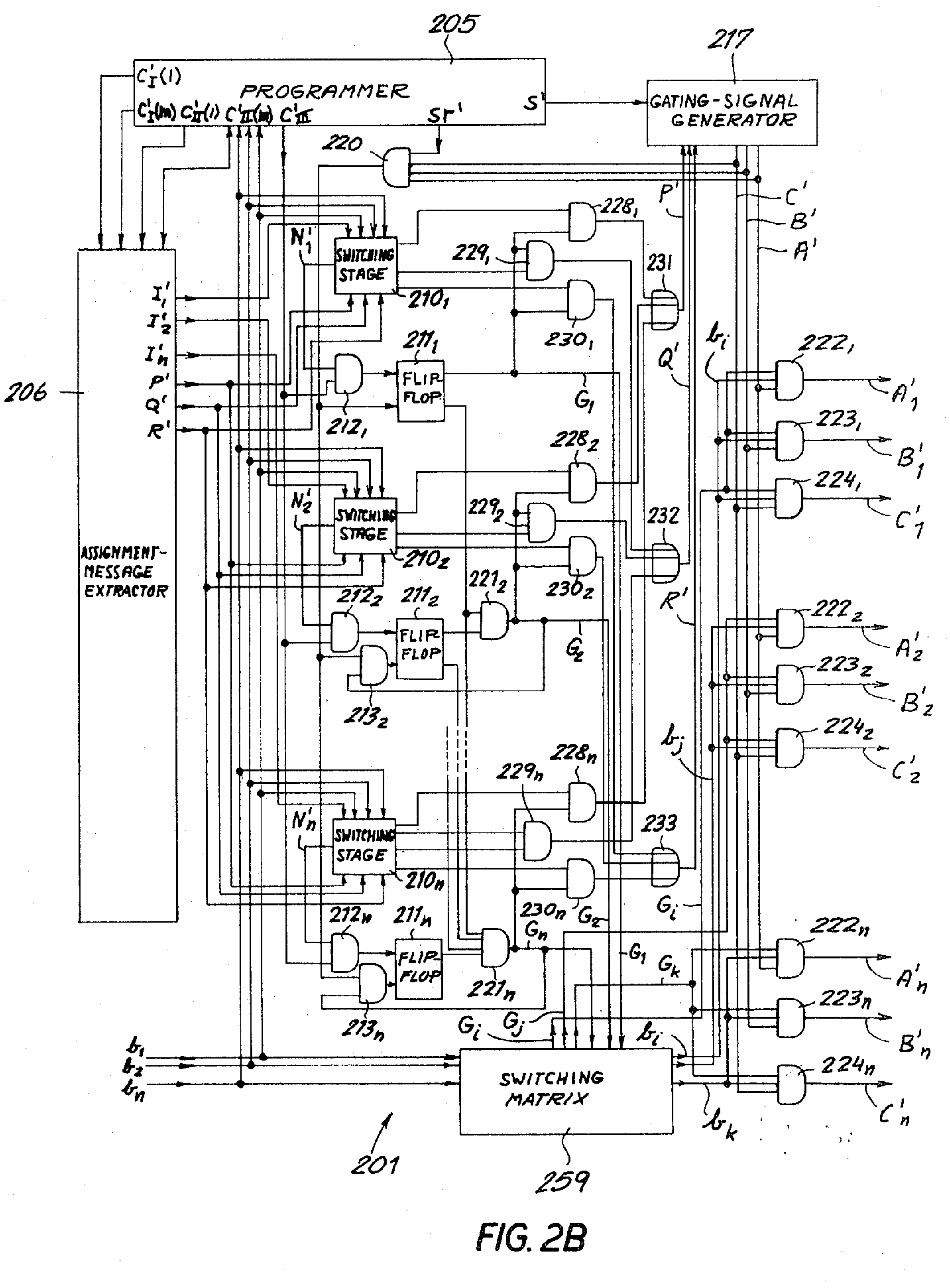

Control circuit 201, FIG. 2B, is similarly constructed with exceptions noted hereinafter; corresponding elements have been designated by analogous reference characters with the addition of a prime mark in the case of letters and substitution of a "2" for the "1" in the position of the hundreds digit in the case of numerals.

Figure 5:
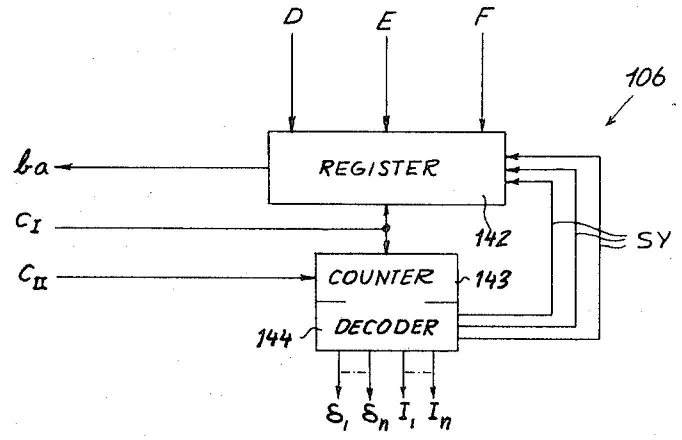
FIG. 5 is a similar diagram of a message generator forming part of the transmitting station.
Figure 4:
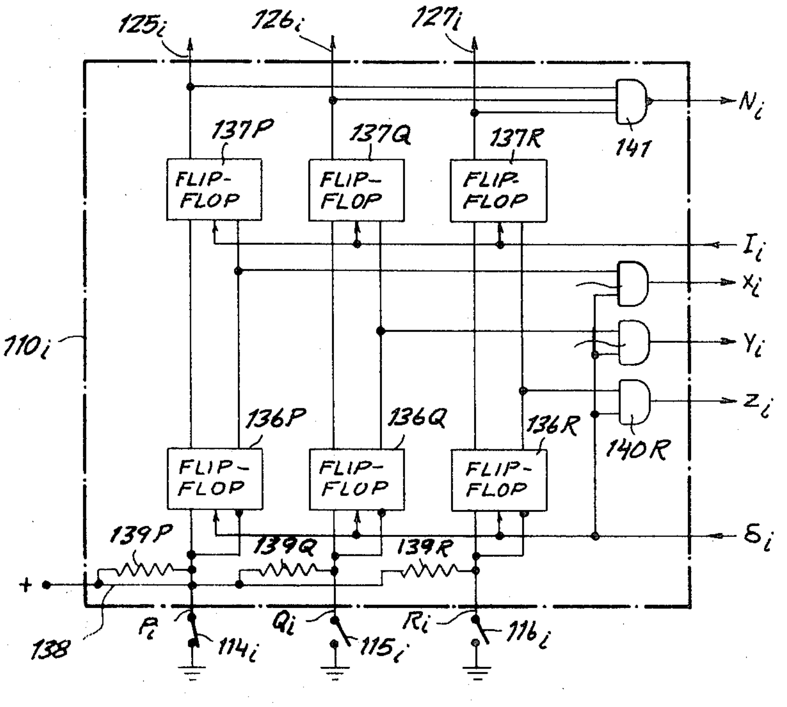
FIG. 4 is a still more detailed circuit diagram of a switching stage included in the transmitting station of FIG. 2A.

In FIG. 4 I have shown a selector stage $110_i$ controlled by manual switches $114_i$, $115_i$, $116_i$ which, when closed (as indicated for switch $114_i$), ground a setting input and invertingly energize a resetting input of respective flip-flops 136P, 136Q and 136R. These flip-flops, as well as three further flip-flops 137P, 137Q, 137R is tandem therewith, are of the so-called J-K type so as to be settable or resettable, depending on the state of energization of the aforementioned inputs, in response to the application of a switching pulse to a central input thereof. These switching pulses, emitted by the message generator 106 as described hereinafter with reference to FIG. 5, are a pulse $\delta_i$ for the flip-flops 136P – 136R of the first tier and a pulse $I_i$ for the flip-flops 137P – 137R of the second tier. The control leads $P_i$, $Q_i$, $R_i$ of the first-tier flip-flops, connected to switches $114_i - 116_i$, are also connected to potential (here positive) on a bus bar 138 by way of respective resistors 139P, 139Q, 139R so as to energize their setting inputs and de-energize their resetting inputs when the corresponding switches are open. The resetting outputs of flip-flops 136P, 136Q, 136R are connected to respective inputs of three AND gates 140P, 140Q, 140R also having other inputs directly connected to lead $\delta_i$. The AND gates thus emit respective activity signals $x_i$, $y_i$, $z_i$ whenever, in the presence of a trigger pulse $\delta_i$, the respective first-tier flip-flop is reset to indicate closure of the corresponding selector switch $114_i - 116_i$. Upon the subsequent occurrence of trigger pulse $I_i$, the conditions of the first-tier flip-flops are communicated to the corresponding second-tier flip-flops so as to reverse any of the latter if the corresponding selector switch had been opened or closed in the interval between successive pulses $I_i$. The set outputs of flip-flops 137P – 137R are connected to respective leads $125_i$, $126_i$, $127_i$ and, through a common NAND gate 141, to a lead $N_i$ controlling the corresponding setting gate of the associated flip-flop $112_i$ as described above with reference to FIG. 2A.

Figure 3B:
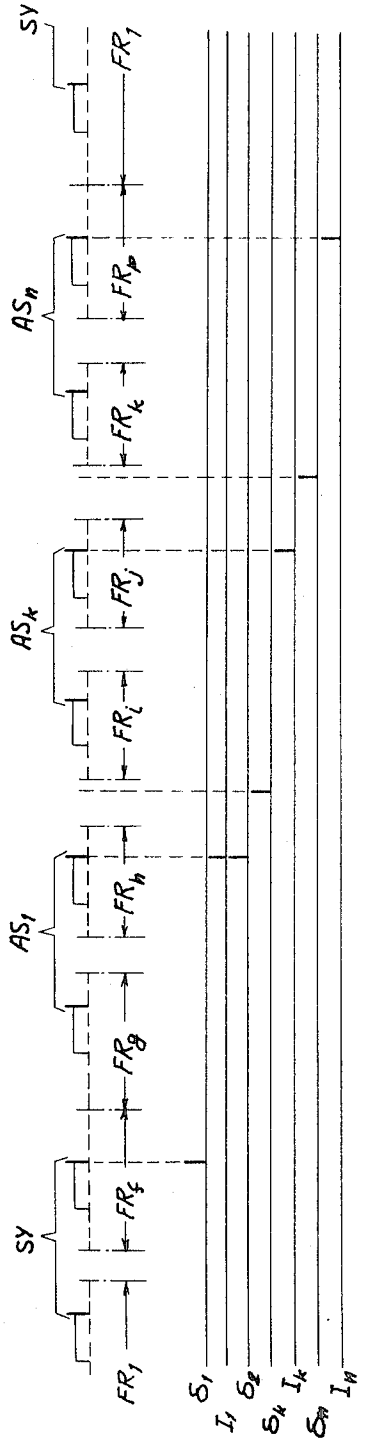

The assignment-message generator 106 illustrated in FIG. 5 comprises a binary register 142 and a counter 143 with associated decoder 144. Register 142 and counter 143 both have stepping inputs connected to lead $c_I$, the counter also having a reading input tied to lead $c_{II}$. Upon the count of corresponding numbers of switching pulses $c_I$, decoder 144 emits the trigger pulses $\delta_1 - \delta_n$ and $I_1 - I_n$ at intervals of several frames as illustrated in FIG. 3B. After a number of frames which may be referred to as a multiframe, counter 143 reaches a terminal position in which its decoder 144 generates a synchronizing code SY fed to register 142. At other times the register 142 receives signals D, E and F from OR gates 107, 108, 109 (FIG. 2A) to which the activity signals $x_1 - x_n$, $y_1 - y_n$ and $z_1 - z_n$ are fed by the several switching stages of FIG. 2A.

Thus, at the end of the first subframe following the restoration of counter 143 to zero, pulse $c_I$ discharges over lead $ba$ the first bit of the synchronizing code SY in the course of a frame designated $FR_1$ in FIG. 3B. In a subsequent frame $FR_f$ the code SY has been fully read out whereupon counter 143 causes the emission of the first trigger pulse $\delta_1$ to sample the setting of switches $114_1$, $115_1$, $116_1$, associated with line $L_1$, as reflected in the presence or absence of voltage on lines $x_1$, $y_1$, $z_1$; the next switching pulse $c_I$, occurring in the following frame $FR_g$, then discharges the first bit of an assignment code $AS_1$ relating to the activity of line $L_1$. Upon the termination of code $AS_1$ in the frame $FR_h$, trigger pulse $L_1$ comes into existence to store the previous switch setting in flip-flops 137P – 137R for the duration of a multiframe while switchover pulse $\delta_2$ initiates the transmission of the next assignment code $AS_2$ relating to the condition of line $L_2$. In an analogous manner, trigger pulses $\delta_k$, $I_k$, $\delta_n$, $I_n$ are generated in later frames $FR_i$, $FR_j$, $FR_k$ and $FR_p$, with retransmission of the first bit of sync code SY during the next occurrence of frame $FR_i$. Bits $ba$ are delivered to synthesizer 103 (FIG. 2A) for incorporation, along with the data bits or the like from lines $L_1 - L_n$, in a bit series sent outover the channel 99 as part of a composite word $d$.

Figure 6:
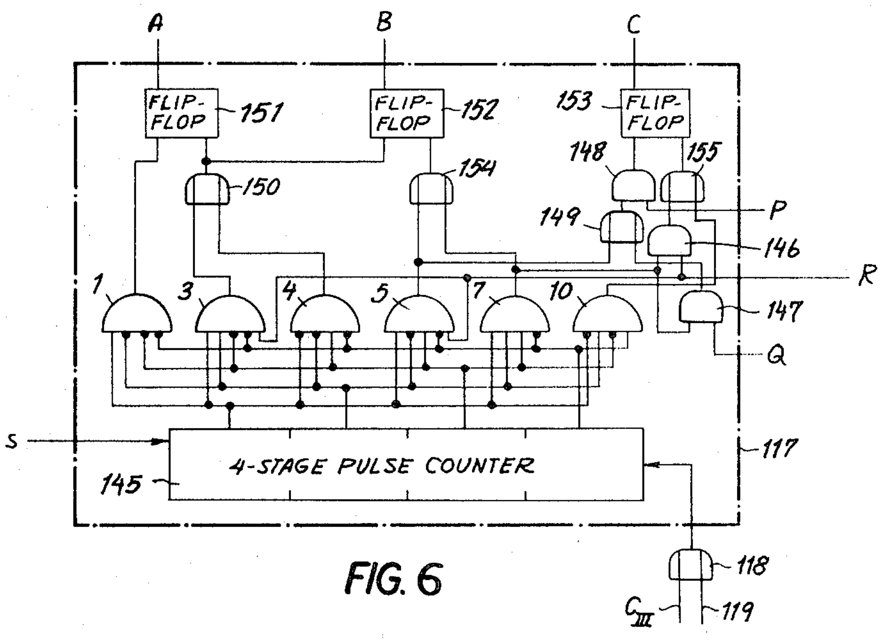
FIG. 6 is a diagram of a gating-signal generator also included in the transmission station.

The gating-pulse generator 117, illustrated in FIG. 6, comprises a four-stage binary counter 145 working into a decoder which comprises a logic matrix including AND gates 1, 3, 4, 5, 7 and 10 (with partly inverting inputs) which generate respective output pulses in response to first, third, fourth, fifth, seventh and tenth stepping pulses *s* reaching the counter after the same has been zeroized by a restoring pulse from OR gate 118. AND gates 3 and 5 have additional (noninverting) inputs connected to lead $R_i$ which also feeds an AND gate 146 in tandem with gate 7. Lead Q is connected to an input of another AND gate 147 also in tandem with gate 7. Lead P works into an input of a further AND gate 148 whose other input is energizable from the output of gate 5 or 147 through an OR gate 148.

Gate 1 works into a setting input of a flip-flop 151 adapted to be reset, through an OR gate 150, by the output of gate 3 or 4 (depending on the state of energization of lead R) with concurrent setting of another flip-flop 152; the latter is resettable, by the output of gate 5 or 7, through an OR gate 154 with concurrent setting of a third flip-flop 154 by way of gates 148 and 149 if lead P and/or Q is energized. Flip-flop 153 is resettable, through an OR gate 155, by the output of gate 10 unless it has been previously reset by an output from gate 7 (in the presence of signal R) by way of gate 146. The set outputs of flip-flops 151, 152, 153 are respectively connected to leads A, B, C.

The energization of lead P allows the setting of flip-flop 153. Lead R, when energized, causes the switch-over from flip-flop 151 to flip-flop 152 to occur on the third instead of the fourth stepping pulse and to reset the latter flip-flop in the fifth rather than the seventh clock cycle, thus establihsing time slots of two in lieu of three cycles for each of the first two wires of a line being sampled. With lead P grounded, the potential of lead Q is immaterial; when leads P and R are both energized but lead Q is grounded, flip-flop 153 is reset by the seventh pulse, whereas the grounding of the two leads R and Q also blocks the flip-flop 153 so that the condition of lead P is immaterial in that case. If leads P and Q carry voltage but lead R does not, flip-flop 153 is reset by the tenth pulse. Simultaneous energization of the three leads P, Q, R is impossible inasmuch as the conditioning pulse $N_i$ is absent if all three switches $114_i$, $115_i$, $116_i$ of a selector stage are open at one time.

The effect of the selective grounding of control leads $P_i$, $Q_i$, $R_i$ of any switching stage $110_i$ upon the output of generator 117 during the corresponding scanning phase can therefore be summarized as follows:

| Length of Gating Pulses: A | B | C | Grounded lead: |
|---|---|---|---|
| 2s | 2s | 0 | $P_i$ |
| 2s | 2s | 2s | $Q_i$ |
| 3s | 3s | 3s | $R_i$ |
| 3s | 3s | 0 | $Q_i+R_i$ |
| 0 | 0 | 0 | $P_i+Q_i+R_i$ |

The last switch position, of course, represents an inactive line.

Figure 3C:
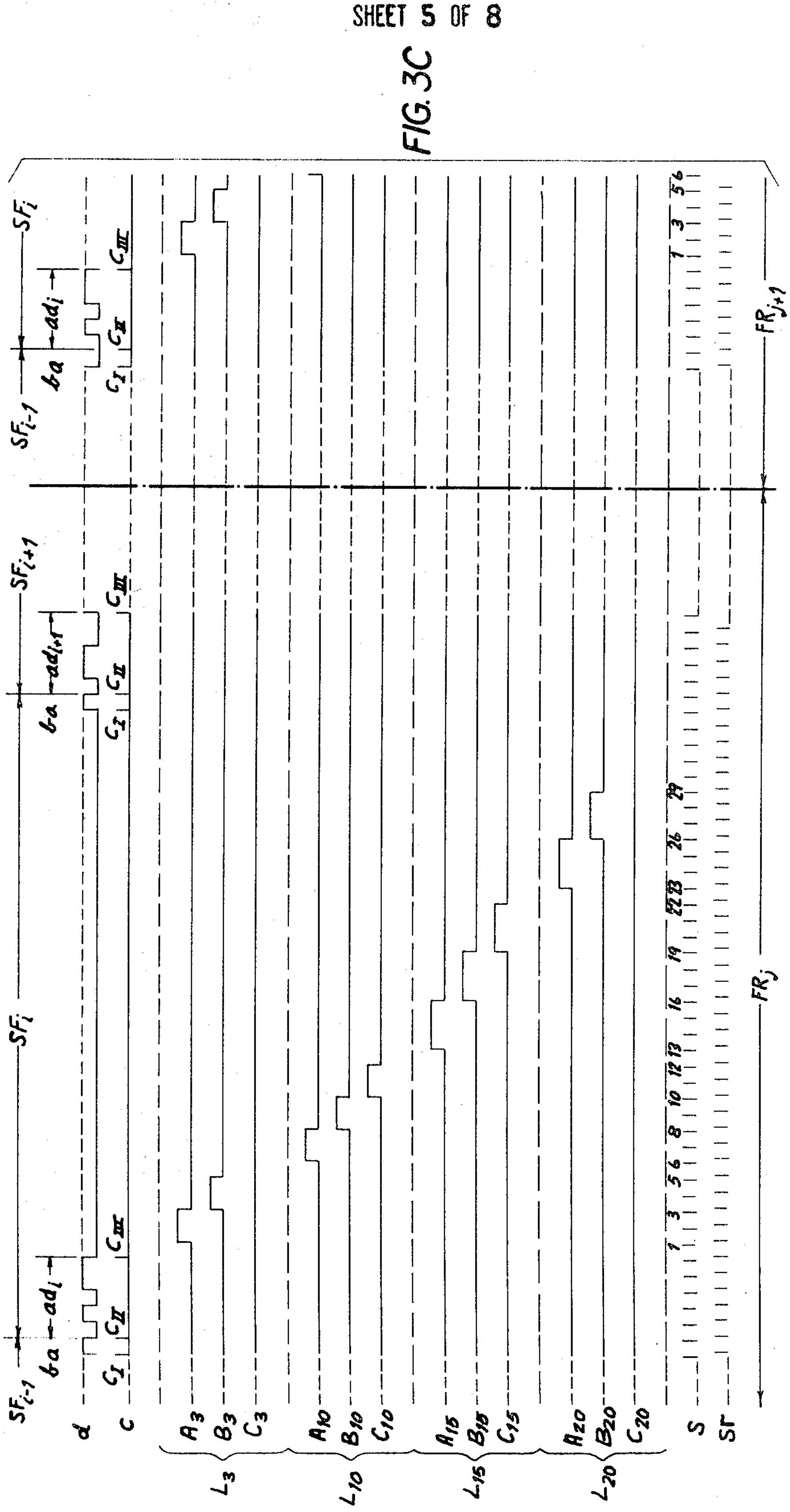

The operation of generator 117 has been illustrated by way of example in FIG. 3C with the assumption that only the third, tenth, fifteenth and twentieth lines $L_3$, $L_{10}$, $L_{15}$ and $L_{20}$ are active, with closure of switches $114_3$, $115_{10}$, $116_{15}$, $115_{20}$ and $116_{20}$. With the switching flip-flops 136P – 136R and 137P – 137R of all the other selector stages set, these stages do not produce either the conditioning signal $N_i$ for their scanning stages or any activity signal $x_i$, $y_i$, $z_i$ for message generator 106.

Thus, the occurrence of pulse $c_{III}$ at the beginning of the message portion of the subframe $SF_i$ (immediately following the address code $ad_i$) zeroizes the counter 145 by way of OR gate 118 whereupon the next stepping pulse *s*, designated No. 1, advances the counter 145 to render the similarly designated AND gate conductive whereby flip-flop 151 is set. With flip-flops 136P and 137P of the third switching stage reset, this stage is the first in the sequence to have an output $N_i = N_3$ so that pulse $c_{III}$ also passes the AND gate $112_3$ to set the flip-flop $111_3$. This operation blocks the output gates $121_4$ – $121_n$ of all higher-order stages, among which the flip-flops $111_{10}$, $111_{15}$ and $111_{20}$ have likewise been set by the pulse $c_{III}$. With lead $125_3$ grounded and leads $126_3$, $127_3$ energized, generator 117 receives selection signals $\overline{P}$, Q, R from OR gates 131, 132, 133. According to the foregoing Table, this results in the generation of gating signals $A_3$ (cycles Nos. 1 and 2) and $B_3$ (cycles Nos. 3 and 4) whereas signal $C_3$ is suppressed. Upon the termination of pulse $B_3$, gate 120 (FIG. 2A) is opened for the passage of the restoring pulse *sr* closely following the stepping pulse s in the fifth cycle. The energization of lead 119 now resets the counter 145 as well as the flip-flop $110_3$, thereby unblocking the output gate $121_{10}$ of the set flip-flop $111_{10}$ next in line. On the sixth clock pulse *s*, counter 145 advances again into its No. 1 position so that gate 1 conducts and sets flip-flop 151 to generate the gating pulse $A_{10}$ which under the assumed conditions (signals P, $\overline{Q}$, R) lasts for two clock cycles, followed by pulses $B_{10}$ and $C_{10}$ of like duration. In the twelfth cycle the counter 145 is again reset and the scanner advances to switching stage No. 15, with resetting of flip-flop $111_{10}$ and setting of flip-flop $111_{15}$ in its stead. On the thirtenth clock pulse, therefore, a new sequence of gating pulses $A_{15}$, $B_{15}$, $C_{15}$ due to selection signals P, Q, $\overline{R}$ is initiated, each spanning three clock cycles. The twenty-second step, terminating the last of these pulses, causes a final switchover to stage No. 20 with resetting of counter 145 and flip-flop $111_{15}$, setting of flip-flop $111_{20}$ and (in the presence of signals P, $\overline{Q}$, $\overline{R}$) generation of two consecutive gating pulses $A_{20}$ and $B_{20}$ extending over three cycles each. Thereafter, a number of filler bits are generated in a number of clock cycles sufficient to complete the count of the subframe, ending with switching pulse $c_I$ which steps the register 142 to transmit a further bit *ba* of the assignment (or synchronizing) code currently stored therein.

It will be noted that the use of a single switching stage for a subgroup of three message sources results in the immediate transition from one gating pulse to the next whereas a gap of one cycle intervenes between gating pulses which establish the time slots assigned to different subgroups.

At the remote terminal 200, decoder 204 recognizes the successive subframes of an incoming frame from their address codes $ad_1, \ldots ad_i, \ldots ad_n$ and sends respective identification signals $b_1$ – $b_n$ to all the associated receiving stations 200(1) – **200(*m*) which are assumed to have equal access to all the arriving messages. In the control circuit 201 illustrated in FIG. 2B, a message extractor 206 replaces the message generator 106 of FIG. 2A and, in a manner described hereinafter with reference to FIG. 7,** derives from the incoming assignment message a set of control signals P′, Q′, R′ fed in parallel to all the switching stages $210_1$, $210_2$,...$210_n$ where they fulfill the same purpose as the corresponding selection signals $P_i$, $Q_i$, $R_i$ of FIGS. 2A and 4. These switching stages also receive the identification signals $b_1 - b_m$, delivered to them in parallel by the decoder 204, as well as individual trigger pulses $I'_1$, $I'_2$,...$L'_n$ also emitted by extractor 206.

In contradistinction to the arrangement of FIG. 2A, the set output of first-stage flip-flop $211_1$ and the outputs of gates $221_2 - 221_n$ of the remaining scanning stages $211_2 - 211_n$ do not work directly into respective AND gates $222_1$, $223_1$, $224_1 - 222_n$, $223_n$, $224_n$ but are connected via leads $G_1$, $G_2$,...$G_n$ to a switching matrix 259 in which these leads may be selectively cross-connected to leads $G_i$, $G_j$, $G_k$ extending to the last-mentioned AND gates. Other leads $b_i$, $b_j$, $b_k$, extending to the same AND gates from matrix 259, can also be selectively cross-connected to any of leads $b_1 - b_n$ so that the messages distributed to any outgoing line $L'_1 - L'_n$ (FIG. 1) may come from any subgroup of consecutive time slots in any subframe.

The synchronizing code SY periodically detected by extractor 206 may be verified, in the above-indicated manner, by means of an integrator which allows the emission of a corresponding reference pulse S' (FIG. 7) only if the same code has been repeated a predetermined number of times in successive multiframes.

Figure 7:
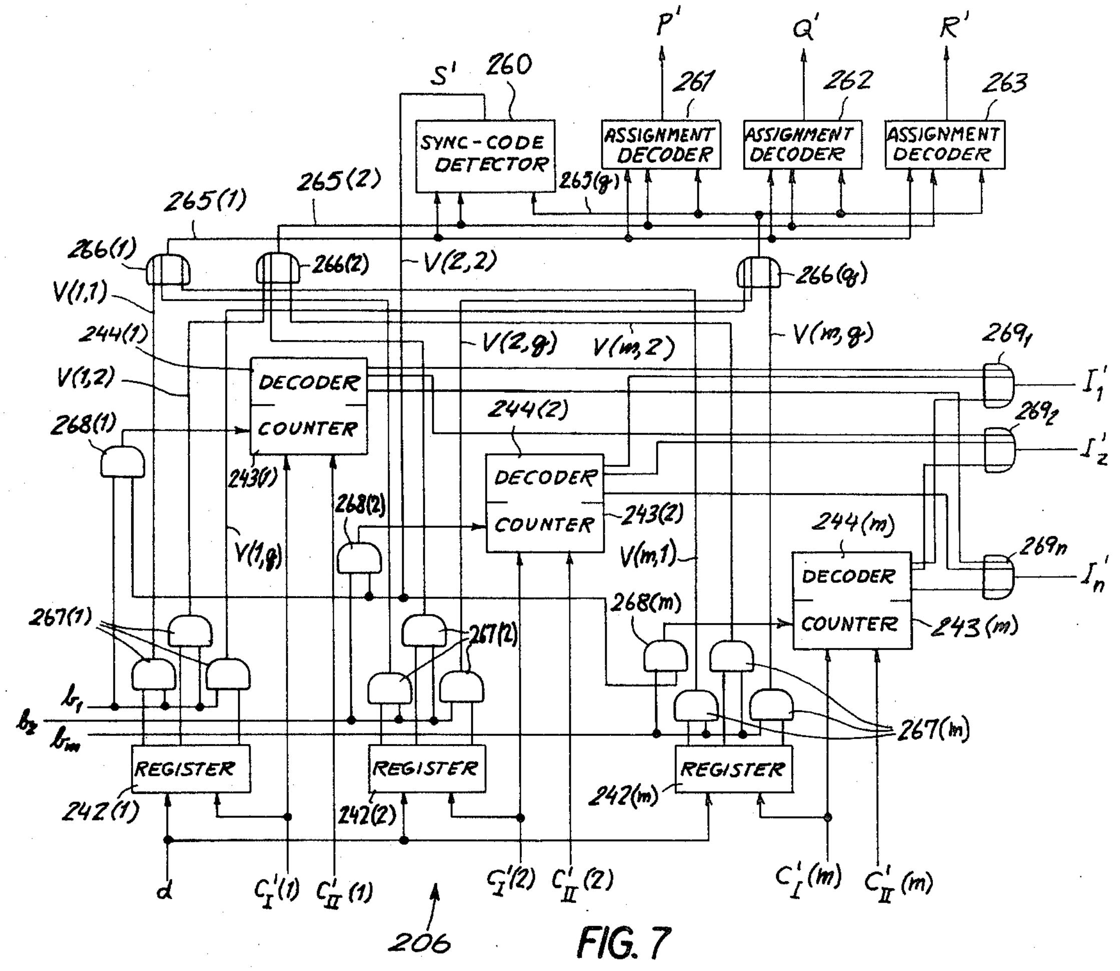
FIG. 7 shows details of a message extractor forming part of the receiving station of FIG. 2B.

Message extractor 206, as illustrated in FIG. 7, comprises a set of input registers 242(1), 242(2),....242($m$) which receive, in addition to the incoming data word $d$, respective switching pulses $c'_I(1)$, $c'_I(2)$,....$c'_I(m)$ from programmer 205 which are generated on the basis of identifying signals $b_1 - b_m$ supplied thereto by decoder 204. The same switching pulses, along with relatively delayed switching pulses $c'_{II}(1)$, $c'_{II}(2)$, ...$c'_{II}(m)$ from the programmer, are also delivered to respective counters 243(1), 243(2),....243($m$) with decoders 244(1), 244(2),....244($m$) where they respectively act as stepping and read-out pulses in the same way as the pulses $c_I$ and $c_{II}$ in the message generator 106 of FIG. 5. Registers 242(1) etc. work into a sync-code detector 260 and three assignment decoders 261, 262, 263 connected in parallel to a set of conductors 265(1), 265(2),....265($q$) which are tied to respective OR gates 266(1), 266(2),....266($q$), $q$ being the number of register stages required to store any of the sync and assignment codes SY, $AS_1 - AS_n$ schematically represented in FIG. 3B. Register 242(1) has its several stage outputs connected through a set of AND gates, collectively designated 267(1) and also tied to lead $b_1$, to a set of conductors V(1,1), V(1,2), ....V(1,$q$) respectively terminating at OR gates 266(1), 266(2), ....266($q$); in an analogous manner, registers 242(2) - 242($m$) control the same OR gates by way of AND gates 267(2) - 267($m$) (respectively tied to leads $b_2 - b_m$) and respective sets of leads V (2,1) - V($m$,1), V (2,2) - V($m$,2),....V(2,$q$) - V($m$,$q$).

Leads $b_1$, $b_2$,....$b_m$ are also connected to respective AND gates 268(1), 268(2),....268(m) further receiving an output pulse S' from sync-code detector 260, these AND gates serving to zeroize the counters 243(1), 243(2),....243($m$) upon recognition of the complete synchronizing code in the respective subframe $SF_1$,....$SF_m$. Decoders 244(1), 244(2),....244($m$) generate, by way of associated OR gates $269_1$, $269_2$,....$269_n$, the trigger pulses $I'_1$, $I'_2$,....$I'_n$ whenever the corresponding counter has completed the count of respective assignment codes $AS_1$, $AS_2$,....$AS_n$. Selection signals P', Q' and R' appear in the outputs of decoders 261,262 and 263, respectively, which could be considered part of a single decoding matrix.

Figure 8:
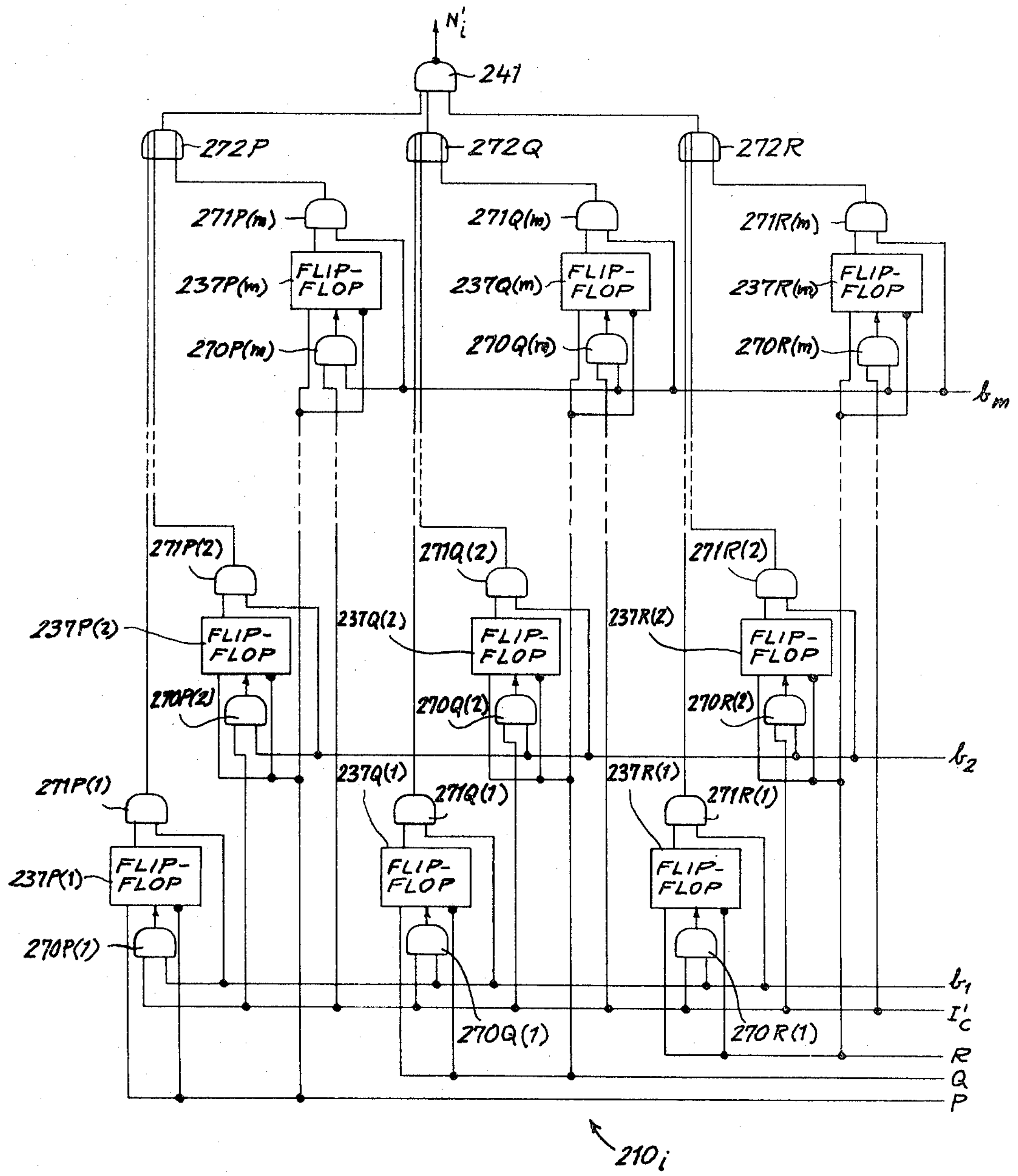
FIG. 8 shows a switching stage included in that receiving station.

FIG. 8 shows the layout of a generic receiving-side switching stage $210_i$. This stage comprises several sets of flip-flops 237P(1), 237Q(1),....237R(1), analogous to flip-flops 137P, 137Q, 137R of FIG. 4, for the time slots of subframe $SF_1$ and similar sets of flip-flops 237P(2) - 237P(m), 237Q(2) - 237Q($m$), 237R(2) - 237R($m$) for the remaining subframes. The switching inputs of these flip-flops are all connected in parallel to a lead $I'_i$, carrying the identically designated trigger pulse for the $i^{th}$ scanning phase of any subframe, by way of respective AND gates 270P(1), 270Q(1), 270R(1); 270P(2), 270Q(2), 270R(2);....270P($m$), 270Q($m$), 270R($m$) receiving the corresponding identity signals $b_1$, $b_2$,....$b_m$ which are also applied to respective AND gates 271P(1), 271Q(1), 271R(1); 271P(2), 271Q(2), 271R(2); ....271P($m$), 271Q($m$), 271R($m$) along with the set outputs of these flip-flops. The outputs of all homologous AND gates 271P(1) - 271P($m$), 271Q(1) - 271Z($m$) and 271R(1) - 271R($m$) are led through respective OR gates 272P, 272Q and 272R to a common NAND gate 241 generating the conditioning signal $N'_i$ for the purpose described in conjunction with gate 141 and signal $N_i$ of FIG. 4. Selection signals P', Q' and R' are applied in parallel to setting and inverting resetting inputs of correspondingly designated flip-flops.

It will be apparent that the relatively complex circuits of FIGS. 7 and 8 could be simplified, with elimination of duplicate registers, counters and flip-flops, if each receiving station were given access only to a single subframe allocated to a correlated transmitting station.

The logical circuitry of gating-pulse generators 117 and 217 could, of course, be modified to provide different lengths of time slots, or selective blocking of more than one source, according to specific requirements.

I claim:

1. A method of communicating binary messages on a time-sharing basis from a multiplicity of message sources to a multiplicity of destinations over a common channel by way of a plurality of transmitting stations having access to an input terminal of said channel and at least one receiving station connected to an output terminal of said channel, said transmitting stations periodically scanning the messages of respective groups of said sources at rates individual to each group, comprising the steps of:

assigning to each group of sources individual time slots, accomodating selected numbers of message bits, in a message portion of a subframe allocated to the associated transmitting station in a recurrent binary frame;

supplementing, at each transmitting station, the assigned time slots in the allocated subframe of successive frames with digital information indicating the state of activity of respective sources of the associated group and the length of any time slot assigned thereto;

synthesizing, at each transmitting station, the message portion of the allocated subframe from a substantially uninterrupted succession of the time slots assigned to the active sources of the associated group; and extracting, at said receiving station, said digital information of successive frames for determining the origin of the message bits of a subframe preparatorily to distributing same to respective destinations.

2. A method as defined in claim 1 wherein said digital information consists of a series of code words each spread over several frames, said code words including a synchronizing code followed by a number of assignment codes each relating to at least one of the sources of the associated group.

3. A method as defined in claim 2 wherein the sources of said associated group are divided into a plurality of subgroups, each assignment code containing information on the state of activity and the length of the assigned time slots of all the sources in a respective subgroup.

4. A telecommunication system for establishing communication between a multiplicity of sources of binary messages and a multiplicity of destinations over a common channel provided with an input terminal and an output terminal, comprising:

a plurality of transmitting stations respectively inserted between said input terminal and associated groups of said sources for giving the latter access to said common channel;

selector means at each transmitting station settable to generate an activity signal for any associated source engaged in message transmission;

timing means at each transmitting station responsive to said activity signal for assigning to every active associated source a respective time slot in a subframe allocated to the respective transmitting station in a recurrent binary frame;

register means at each transmitting station controlled by said selector means for storing digital information indicating the state of activity of every associated source and the duration of any time slot assigned thereto;

synthesizing means at each transmitting station connected to said sources and to said register means for combining incoming message bits from all associated active sources into a substantially continuous bit train accompanied by part of the stored digital information for inclusion in the allocated subframe;

multiplexing means at said input terminal connected to said synthesizing means of each transmitting station for sending their respective subframes as part of a frame over said channel;

a receiving station inserted between said output terminal and certain of said destinations for selectively distributing thereto the message bits destined for them in a frame arriving over said channel; and extractor means at said receiving station for retrieving said digital information to determine therefrom the location within each frame of the message bits destined for said certain of said sources.

5. A system as defined in claim 4 wherein said selector means comprises a plurality of switching stages each individually adjustable to vary the duration of the time slots assigned to respective sources.

6. A system as defined in claim 5 wherein said multiplexing means includes an emitter of clock pulses; said timing means comprising a logic matrix, a counter for said clock pulses having certain outputs connected to said logic matrix, and scanning means for successively connecting different switching stages of said selector means to said logic matrix for generating a sequence of gating pulses, said counter being connected to be set to zero in the absence of a gating pulse from said logic matrix.

7. A system as defined in claim 6 wherein the sources of at least one group are divided into a plurality of subgroups, each of said switching stages at the transmitting station associated with said one group being operable to emit a variety of activity signals for controlling the generation of an unbroken succession of gating pulses for the active sources of a respective subgroup between zero settings of the counter.

8. A system as defined in claim 6 wherein said timing means includes a programmer for the generation of periodic switching pulses and wherein said scanning means comprises a plurality of bistable circuits respectively conditionable by said switching stages in the presence of an activity signal for setting by a switching pulse at the beginning of a subframe and resettable by delayed replicas of said clock pulses in the absence of a gating pulse from said logic matrix, said bistable circuits being interconnected in a lockout chain for consecutive enablement, upon setting, to connect their respective switching stages in a predetermined order to said logic matrix, said programmer further generating a read-out pulse for the digital information stored in said register means prior to generation of said switching pulse.

9. A system as defined in claim 8 wherein said register means is provided with counting means for successive read-out pulses connected to emit, during certain frames in a predetermined series of frames, switchover signals for successively entering a synchronizing code and a plurality of assignment codes in said register means to be read out bit by bit in consecutive frames, said switching stages being connected to said counting means for individual enablement by respective switchover signals to modify their activity signals in response to an intervening readjustment.

10. A system as defined in claim 6 wherein said receiving station includes storage means for the digital information retrieved by said extractor means, switch means controlled by said storage means for reconstituting the activity signals generated by said selector means, distributor means for channeling incoming bits to respective destinations, and gating means responsive to the reconstituted activity signals for operating said distributor means in the rhythm of said gating pulses.

* * * * *